(12) United States Patent
Lang et al.

(10) Patent No.: US 10,025,582 B2
(45) Date of Patent: *Jul. 17, 2018

(54) APPLYING PROGRAM PATCH SETS

(71) Applicant: International Business Machines Corporation, Armonk, NY (US)

(72) Inventors: Jakob C. Lang, Altdorf (DE); Angel Nunez Mencias, Stuttgart (DE); Thomas Pohl, Bempflingen (DE); Martin Troester, Renningen (DE)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/964,804

(22) Filed: Dec. 10, 2015

(65) Prior Publication Data

US 2017/0168798 A1 Jun. 15, 2017

(51) Int. Cl.
*G06F 9/44* (2018.01)
*G06F 8/65* (2018.01)
*G06F 17/30* (2006.01)

(52) U.S. Cl.
CPC .......... *G06F 8/65* (2013.01); *G06F 17/30088* (2013.01)

(58) Field of Classification Search
None
See application file for complete search history.

(56) References Cited

U.S. PATENT DOCUMENTS

| | | | | |
|---|---|---|---|---|
| 6,378,124 | B1* | 4/2002 | Bates | G06F 11/3632 714/707 |
| 7,788,664 | B1 | 8/2010 | Janakiraman et al. | |
| 7,913,243 | B2* | 3/2011 | Axnix | G06F 8/656 717/168 |
| 8,032,351 | B2* | 10/2011 | Stringham | G06F 11/0712 703/21 |

(Continued)

OTHER PUBLICATIONS

Fan, "OPS: Offline Patching Scheme for the Images Management in a Secure Cloud Environment", 2013 IEEE 10th International Conference on Services Computing, 2013.*

(Continued)

*Primary Examiner* — Wei Zhen
*Assistant Examiner* — Hossain Morshed
(74) *Attorney, Agent, or Firm* — L. Jeffrey Kelly

(57) ABSTRACT

Embodiments of the present invention disclose a method, computer program product, and system for applying a plurality of program patch sets on a plurality of computer programs. Virtual machines are prepared to be patchable, in response to a suspended computer program. Synchronized snapshots of the virtual machines are created. A plurality of binary code sections of each of the synchronized snapshots are determined. Symbol data information of each of the synchronized snapshots are analyzed, based on the program patch sets. The determined binary code sections are replaced with a set of patch data, based on the plurality of program patch sets, resulting in patched snapshots for each of the synchronized snapshots. Dependencies of the patch data are adjusted, based on the replaced plurality of binary code (Continued)

sections and the execution of the computer program on each of the virtual machines are resumed using the plurality of patched snapshots.

18 Claims, 7 Drawing Sheets

(56) References Cited

U.S. PATENT DOCUMENTS

| | | | | |
|---|---|---|---|---|
| 8,352,933 | B2* | 1/2013 | Amann | G06F 8/656 |
| | | | | 717/170 |
| 8,458,688 | B2* | 6/2013 | Ashok | G06F 8/65 |
| | | | | 717/169 |
| 8,635,395 | B2* | 1/2014 | Colbert | G06F 9/45558 |
| | | | | 711/6 |
| 8,839,225 | B2* | 9/2014 | Mencias | G06F 8/67 |
| | | | | 717/169 |
| 2009/0260007 | A1* | 10/2009 | Beaty | G06F 9/5077 |
| | | | | 718/1 |
| 2010/0235835 | A1* | 9/2010 | Nishiguchi | G06F 9/485 |
| | | | | 718/1 |
| 2012/0066680 | A1* | 3/2012 | Amano | G06F 8/658 |
| | | | | 718/1 |
| 2013/0055206 | A1* | 2/2013 | Dudek | G06F 9/45558 |
| | | | | 717/124 |
| 2014/0279909 | A1* | 9/2014 | Sudarsanam | G06F 17/30088 |
| | | | | 707/639 |
| 2014/0282463 | A1* | 9/2014 | Peckham | G06F 8/656 |
| | | | | 717/168 |
| 2015/0067267 | A1 | 3/2015 | Pizlo | |
| 2017/0168798 | A1* | 6/2017 | Lang | G06F 8/65 |

OTHER PUBLICATIONS

Roettinger, "Orchestrated offline VM Patching using Service Management Automation", Building Clouds, Dec. 6, 2013, 7 pages.

Larsen et al., "Utility Spotlight", Offline Virtual Machine Servicing Tool, TechNet Magazine, Oct. 2008 Issue, 4 pages.

Hidayat, "Real-Time Clock with MC146818", OFILABS, Aug. 31, 2012, pp. 1-5.

IBM: List of IBM Patents or Patent Applications Treated as Related (Appendix P), May 6, 2016, pp. 1-2.

Lang et al., Pending U.S. Appl. No. 15/147,950, filed May 6, 2016, titled "Applying Program Patch Sets,", pp. 1-30.

Fan et al., "OPS: Offline Patching Scheme for the Images Management in a Secure Cloud Environment", 2013 IEEE 10th International Conference on Services Computing, pp. 587-594.

* cited by examiner ively running) computer program can be loaded and executed on a computer system. A commonly employed method is to use a memory layout of the Operating System. Such a memory layout can be created during system initialization. Typically, preparing such a memory layout comprises allocating a module thread local storage (TLS) block for each thread within an initial computer program, wherein the allocated module TLS blocks are large enough to hold all module thread variables that are loaded or to be loaded. Further preparing such a memory layout further comprises providing constant offsets between module TLS block pointers corresponding to the module TLS blocks and the module thread variables for all of the threads. Modules can be added to the original computer program or a concurrent patch can be applied by replacing one or more of the plurality of original computer program modules.

APPLYING PROGRAM PATCH SETS

BACKGROUND

The present invention relates generally to the field of data processing systems, and more particularly to applying program patch sets to computer programs.

Computer users have long had a need for continuous, non-disrupted operation. Methods have been developed to modify and update computer programs concurrently with their execution, where new code, or a patch, is loaded into the computer.

Typically, a computer program consists of various sections, such as, executable machine code, static data variables, and temporary data. The executable code may be comprise of various procedures that are called via their address in memory. A static data variable is kept valid in the same memory address during the entire execution of the program. In contrast, a temporary data variable (and its location in memory) is only valid during certain periods of the program execution, for example, during the execution of a specific procedure.

Typically concurrently loading a plurality of new modules while code of a plurality of modules of an original (i.e., currently running) computer program can be loaded and executed on a computer system. A commonly employed method is to use a memory layout of the Operating System. Such a memory layout can be created during system initialization. Typically, preparing such a memory layout comprises allocating a module thread local storage (TLS) block for each thread within an initial computer program, wherein the allocated module TLS blocks are large enough to hold all module thread variables that are loaded or to be loaded. Further preparing such a memory layout further comprises providing constant offsets between module TLS block pointers corresponding to the module TLS blocks and the module thread variables for all of the threads. Modules can be added to the original computer program or a concurrent patch can be applied by replacing one or more of the plurality of original computer program modules.

SUMMARY

Embodiments of the present invention disclose a method, computer program product, and system for applying a plurality of program patch sets on a plurality of computer programs. At least two virtual machines are prepared to be concurrently patchable, in response to suspending execution of a computer program on each of the virtual machines. A synchronized snapshot of each of the at least two virtual machines is created. A plurality of binary code sections of each of the synchronized snapshots are determined. Symbol data information of each of the synchronized snapshots are analyzed, based on the plurality of program patch sets. The determined plurality of binary code sections are replaced with a set of patch data, based on the plurality of program patch sets, resulting in a plurality of patched snapshots for each of the synchronized snapshots. Dependencies of the patch data are adjusted, based on the replaced plurality of binary code sections and the execution of the computer program on each of the virtual machines are resumed using the plurality of patched snapshots.

DETAILED DESCRIPTION

Figure 1:
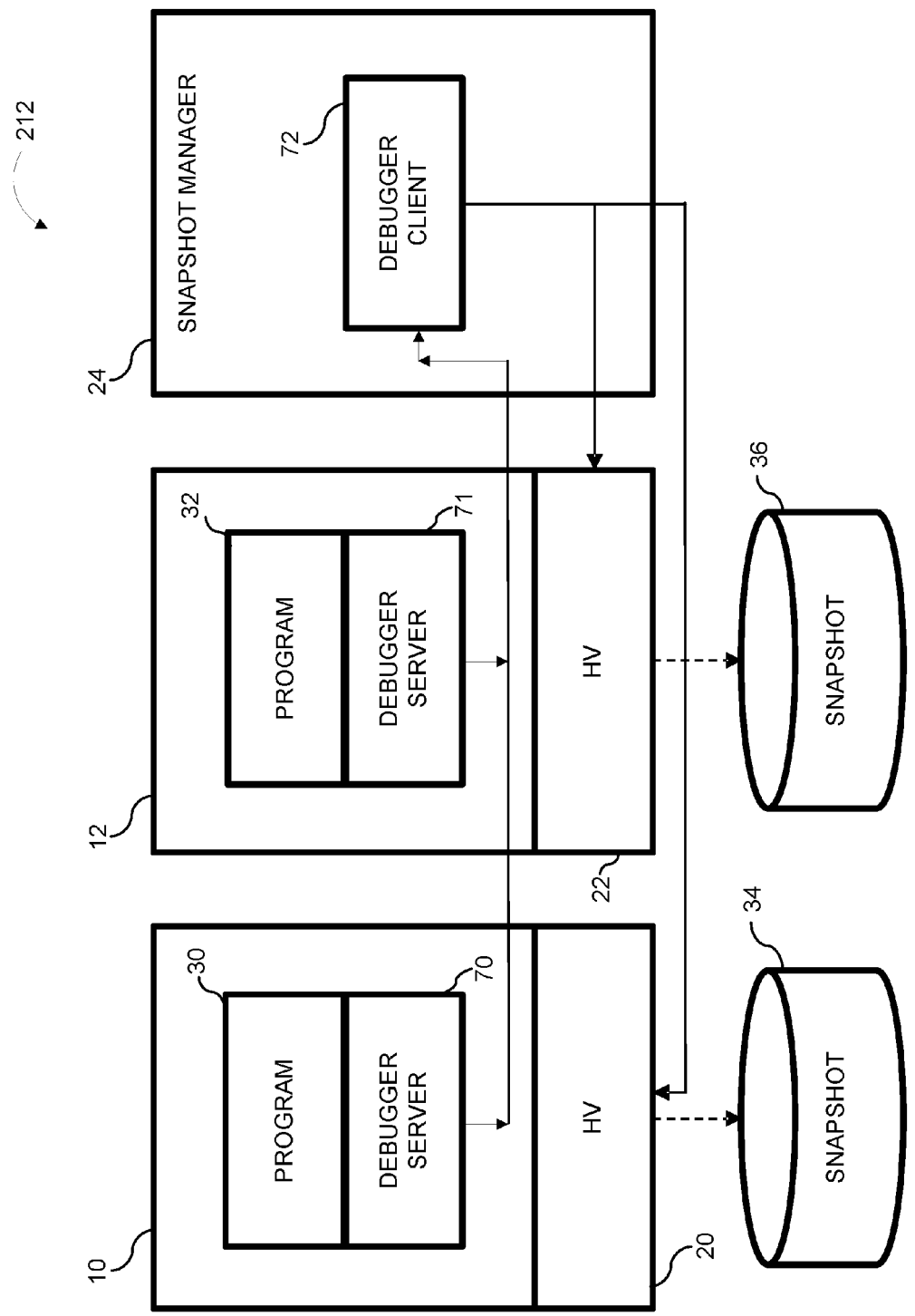
FIG. 1 is a functional block diagram illustrating a system for creating synchronized snapshots of two virtual machines, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method, system, and computer program product for applying program patch sets to computer programs executed simultaneously in at least two virtual machine running on at least one computer system or, alternatively, in at least two physical machines. The illustrative embodiments may be described herein using particular technologies only as an example for the clarity of the description. The illustrative embodiments may be used for performing the following subsequent steps for each patch set: (i) preparing the virtual machines for being concurrently patchable; (ii) creating a synchronized snapshot of the virtual or physical machines; (iii) for each snapshot determining binary code sections to be patched by analyzing symbol data information stored in the respective snapshot depending on a specific patch in the respective patch set; (iv) replacing the determined binary code sections by corresponding patch data as well as adjusting dependencies of the patch data according to the symbol data information; and (v) resuming the execution of the virtual or physical machines using the patched snapshots.

The embodiments depicted in the FIGS. 1 to 5 are exemplified using virtual machines. Alternatively, physical machines of the computer system may be used with the inventive method, using typical hibernation mechanisms for physical machines.

The present invention will now be described in detail with reference to the Figures. FIG. 1 illustrates an embodiment of a computer system 212, for creating synchronized snapshots of two virtual machines, in accordance with an embodiment of the present invention. The computer system includes virtual machines 10 and 12, and snapshot manager 24. The virtual machines 10 and 12 are run with hypervisors 20, 22 and both executing computer programs 30 and 32. On each virtual machines 10 and 12 a debugger servers 70 and 71 is executed respectively. Synchronized snapshots 34 and 36 of the virtual machines 10 and 12 may be created in response to detecting a break point by the debugger servers 70 and 71, executed in one of the virtual machines 10 and 12. In various embodiments, virtual machines 10 and 12 are physical. The debugger servers 70 and 71 communicate with a debugger client 72 executing in snapshot manager 24. The snapshot manager 24 triggers the hypervisors 20 and 22 to suspend the virtual machines 10 and 12 and to create the synchronized snapshots 34 and 36. The synchronized snapshots 34 and 36 are stored in a memory of the computer system 212.

Figure 6:
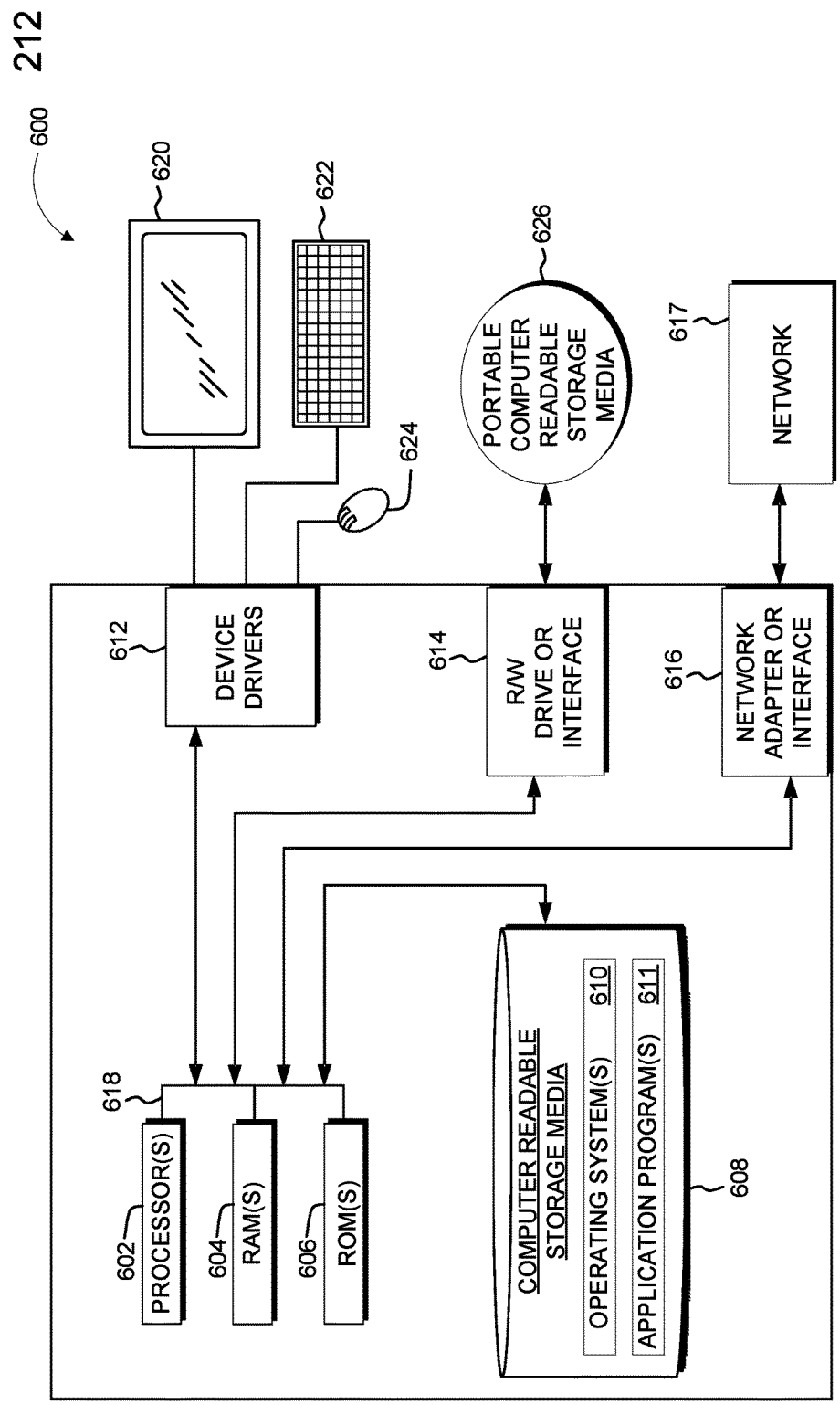
FIG. 6 is a block diagram depicting components of a computer of a data processing system for executing the method, in accordance with an embodiment of the present invention.

Virtual machines 10 and 12 may run on one or more processing units within computer system 212 as described in further detail in reference to FIG. 6, for example, processors 602. Processors 602 (FIG. 6) executing virtual machines 10 and 12 may not be executing a function at the time the synchronized snapshots 34 and 36 are created. Processors 602 may be prepared to generate the synchronized snapshots 34 and 36 by bringing the one or more processors 602 to a concurrent patchable state by synchronizing the processors 602. This may bring processors 602 into a "prepared for snapshot" state.

In various embodiments, the synchronized snapshots 34 and 36 for the virtual machines 10 and 12 may be created at a pre-determined instant of time. Virtual machines 10 and 12 may also be physical machines, according to various embodiments of the invention. Additionally, the synchronized snapshots 34 and 36 may be created in response to pre-determined data being generated by the computer programs 30 and 32. Snapshots 34 and 36 may be generated by the snapshot manager 24 triggering the hypervisors 20 and 22 running on the computer system 212.

Figure 2:
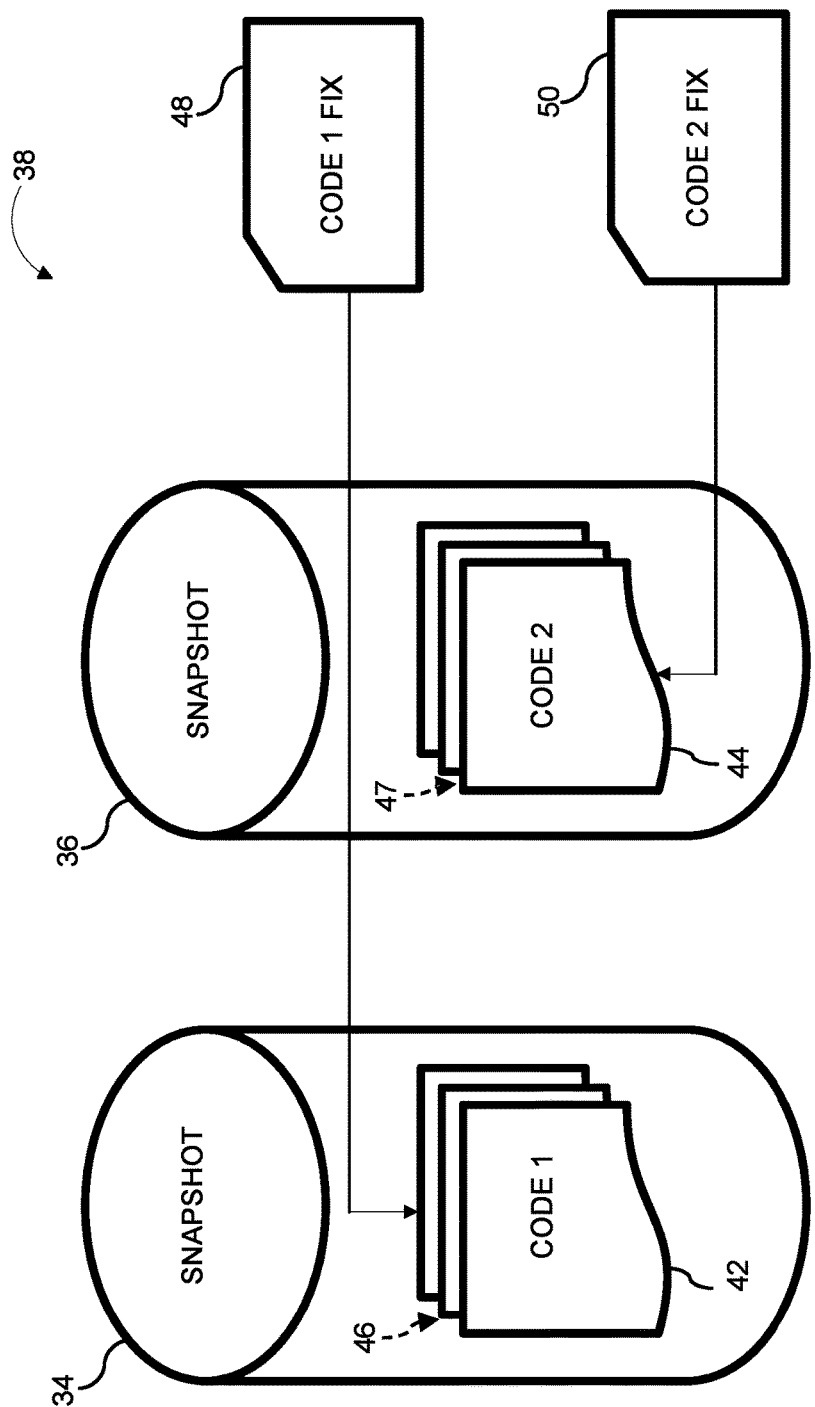
FIG. 2 is a functional block diagram illustrating a system for replacing binary code sections in the snapshots with patch data, in accordance with an embodiment of the present invention.

In reference to FIG. 2, a functional block diagram illustrating a system for replacing binary code sections in the snapshots with patch data is shown. FIG. 2 includes a system for replacing the binary code sections 42 and 44 in the synchronized snapshots 34 and 36 with patch data 48 and 50 of a specific patch set 38, according to an embodiment of the invention. As the synchronized snapshots 34 and 36 are clones of the suspended virtual machines 10 and 12, the synchronized snapshots 34 and 36 comprise the computer programs 30 and 32 as binary code. The binary code sections 42 and 44, to be patched, are determined by using the debugger servers 70 and 71, or combinations of debuggers and/or symbol tables in the computer programs 30 and 32. Symbol data information 46 stored in the respective synchronized snapshot 34 are analyzed for determining the binary code sections 42. Symbol data information 47 stored in the respective snapshot 36 are analyzed for determining the binary code sections 44. Code fixes are generated as various patch data 48 and 50 for the computer programs 30 and 32 in order to solve possible problem situations in the program code. The determined binary code sections 42 and 44 are replaced in the synchronized snapshots 34 and 36 by the corresponding patch data 48 and 50 of a patch set 38, wherein dependencies are adjusted by adapting references and/or applying relocations to the patched binary code sections 42 and 44 replaced by the patch data 48 and 50 according to symbol data information 46 and 47. These binary code sections 42 and 44 may be written even in a suspended state. A different patch set 38 generated in order to be able to investigate different possibilities may be able to fix a possible problematic situations in the program code, such that various test scenarios may be executed and tested.

Figure 3:
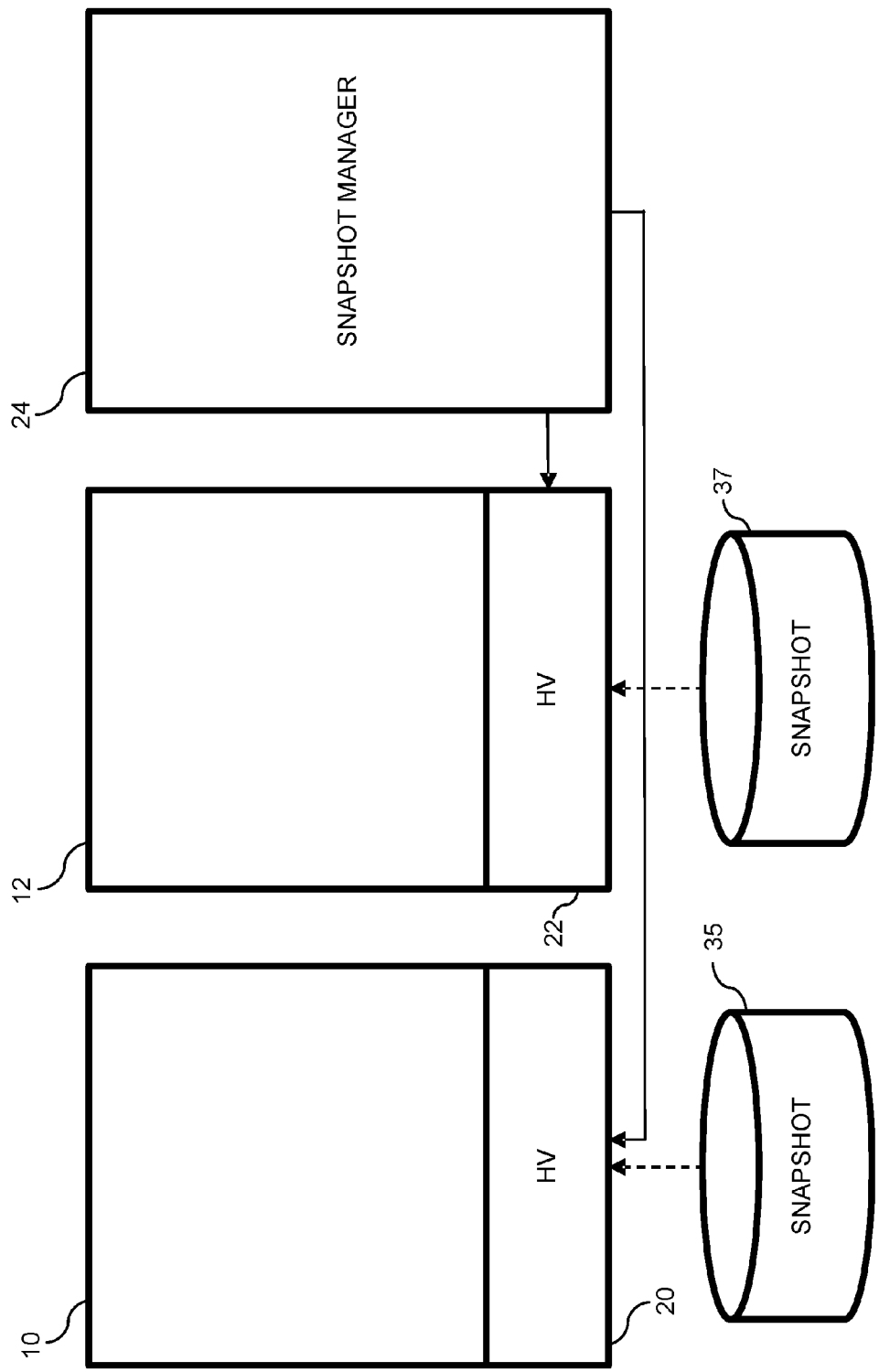
FIG. 3 is a functional block diagram illustrating a system for restoring the patched snapshots into the two virtual machines, in accordance with an embodiment of the present invention.

Referring to FIGS. 1, 2, and 3, FIG. 3 is a functional block diagram illustrating a system for restoring the patched snapshots into the two virtual machines, in accordance with an embodiment of the present invention. FIG. 3 illustrates a system for restoring the patched snapshots 35 and 37 into the two virtual machines 10 and 12 according to an embodiment of the invention. The patched snapshots 35 and 37 may be replaced by the computer programs 30 and 32 in the virtual machines 10 and 12, in order to resume execution of the virtual machines 10 and 12. The patched snapshots 35 and 37 are restored via the corresponding hypervisors 20 and 22. Resuming the execution of the virtual machines 10 and 12 is then triggered by the snapshot manager 24 through the hypervisors 20 and 22. Test cases may be executed in the virtual machines 10 and 12 to determine a test pass condition with the patched computer programs 30 and 32. The whole testing of the patch set 38 may be performed by the snapshot manager 24, executing a debugger client 74. If the test pass condition fails, execution of the computer programs 30 and 32 may be continued with a next patch set (not shown) from a sequence of patch sets, or execution on the processing unit 216 may be continued as normal.

Figure 4:
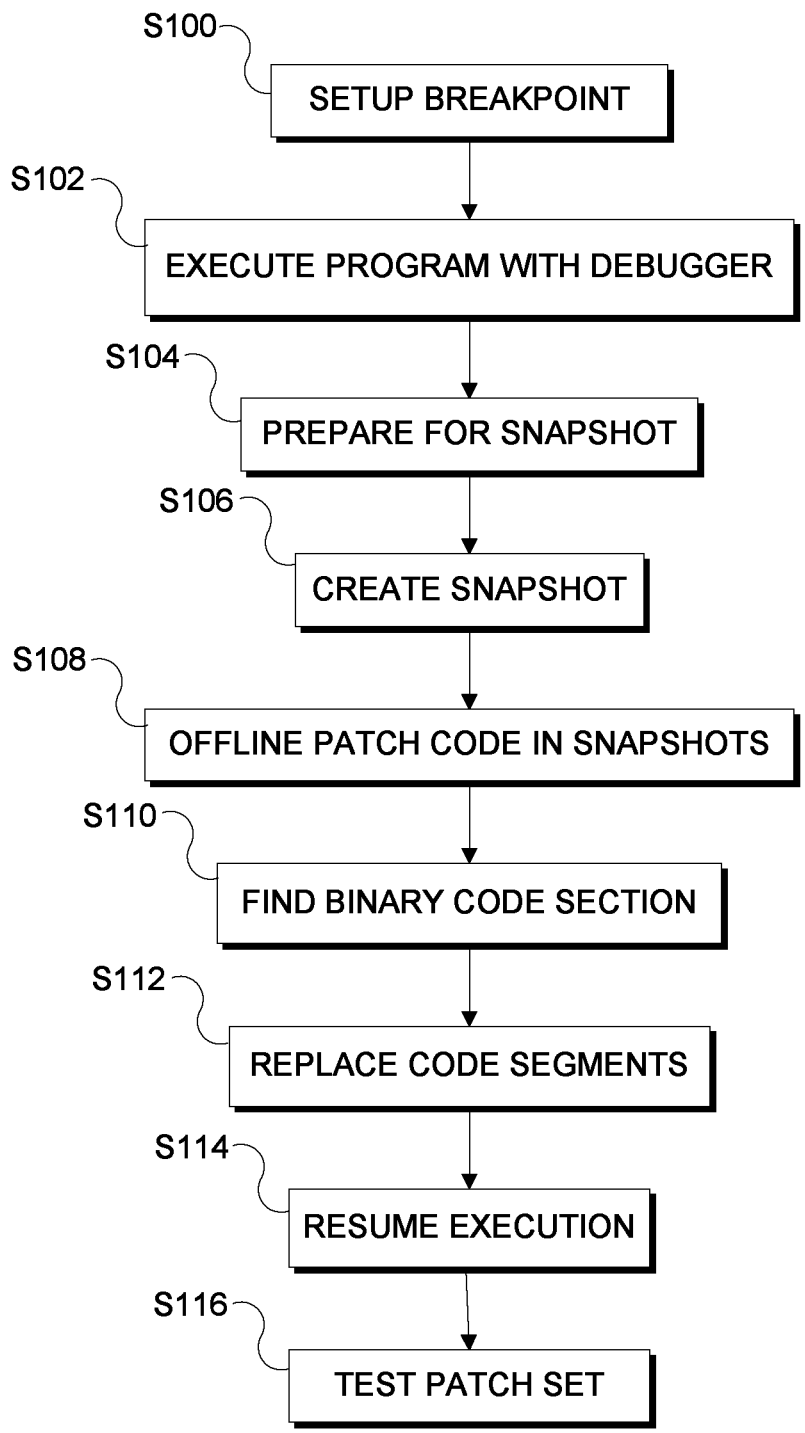
FIG. 4 is a flowchart depicting operational steps of a method for applying and testing program patch sets for computer programs using snapshots of virtual or physical machines, in accordance with an embodiment of the present invention.

Referring to 4, a flowchart depicting operational steps of a method for applying and testing program patch sets for computer programs using snapshots of virtual or physical machines is shown. FIG. 4 illustrates an exemplary process of the method for applying and testing the program patch set 38 for the computer programs 30 and 32 using the synchronized snapshots 34 and 36 of the virtual machines 10 and 12 according to an embodiment of the invention.

Now referring to FIGS. 1, 2, 3, and 4, in step S100, the setup breakpoint on the program situation where the synchronized snapshots 34 and 36 are created is generated. In step S102, the virtual machines 10 and 12 run supervised by the snapshot manager 24 having the debugger servers 70 and 71 running to enable breakpoint detection. When the breakpoint condition is reached, the snapshot manager 24 brings the computer system 212 to a patchable state in step S104, for example, the processors 602 (FIG. 6) are prepared, by synchronizing the processors 602, for the synchronized snapshots 34 and 36 to be created. In step S106 the synchronized snapshots 34 and 36 are created and a generated offline patch code is initiated in step S108. In step S110, the program locations within the synchronized snapshots 34 and 36 as binary code sections 42 and 44 are located using the debugger servers 70 and 71. In step S112, the binary code sections 42 and 44 in the affected computer programs 30 and 32 are replaced. References are adapted and relocations are applied to the patched binary code in order to restore the patched snapshots 35 and 37 onto the virtual machines 10 and 12 and to resume execution of the virtual machines 10 and 12, in step S114. In step S116, the patch set 38 is tested to determine the test pass condition.

Figure 5A:
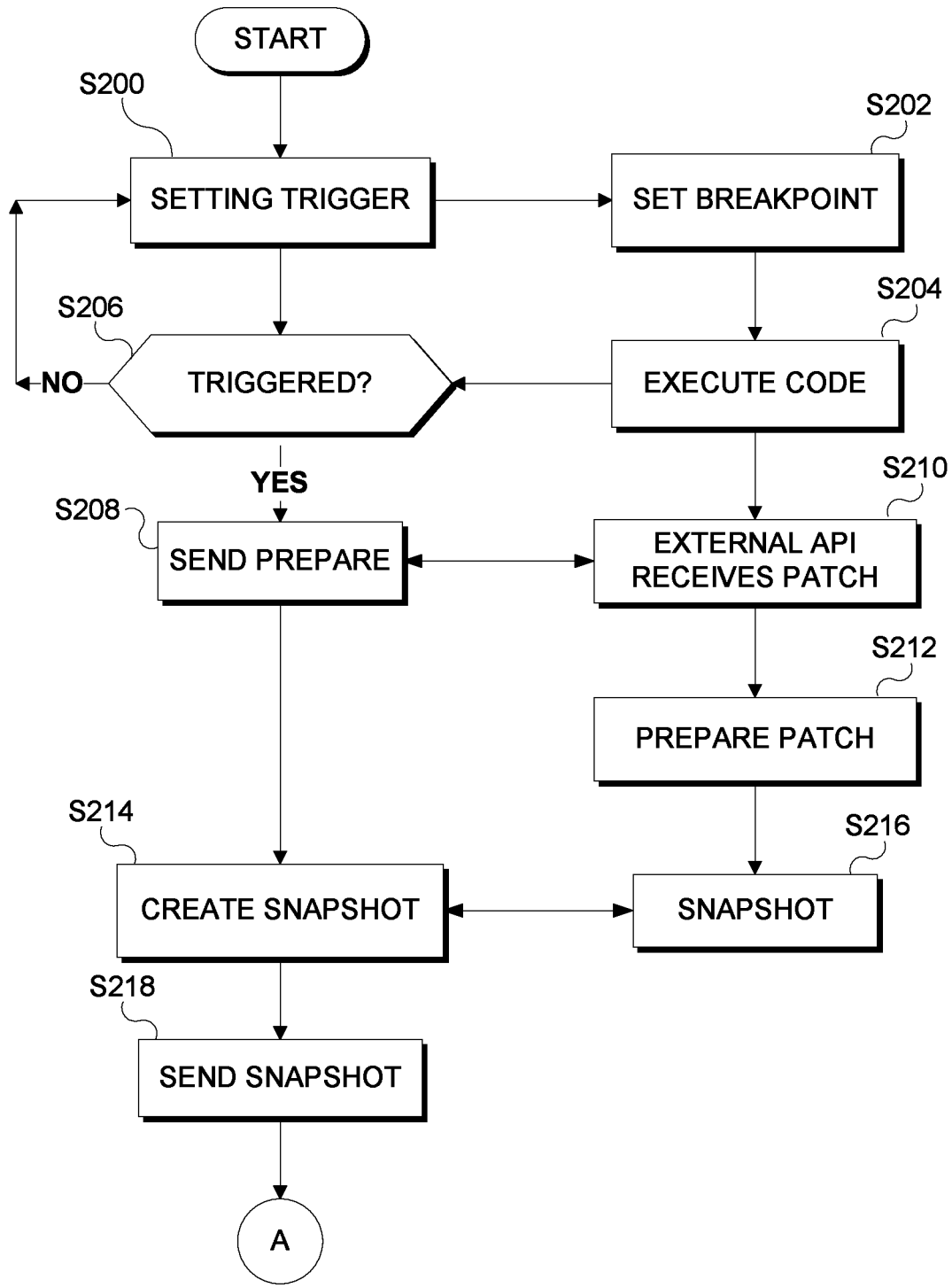
FIG. 5A and FIG. 5B are flowcharts depicting operational steps of applying a patch in a test loop, in accordance with an embodiment of the present invention.
Figure 5B:
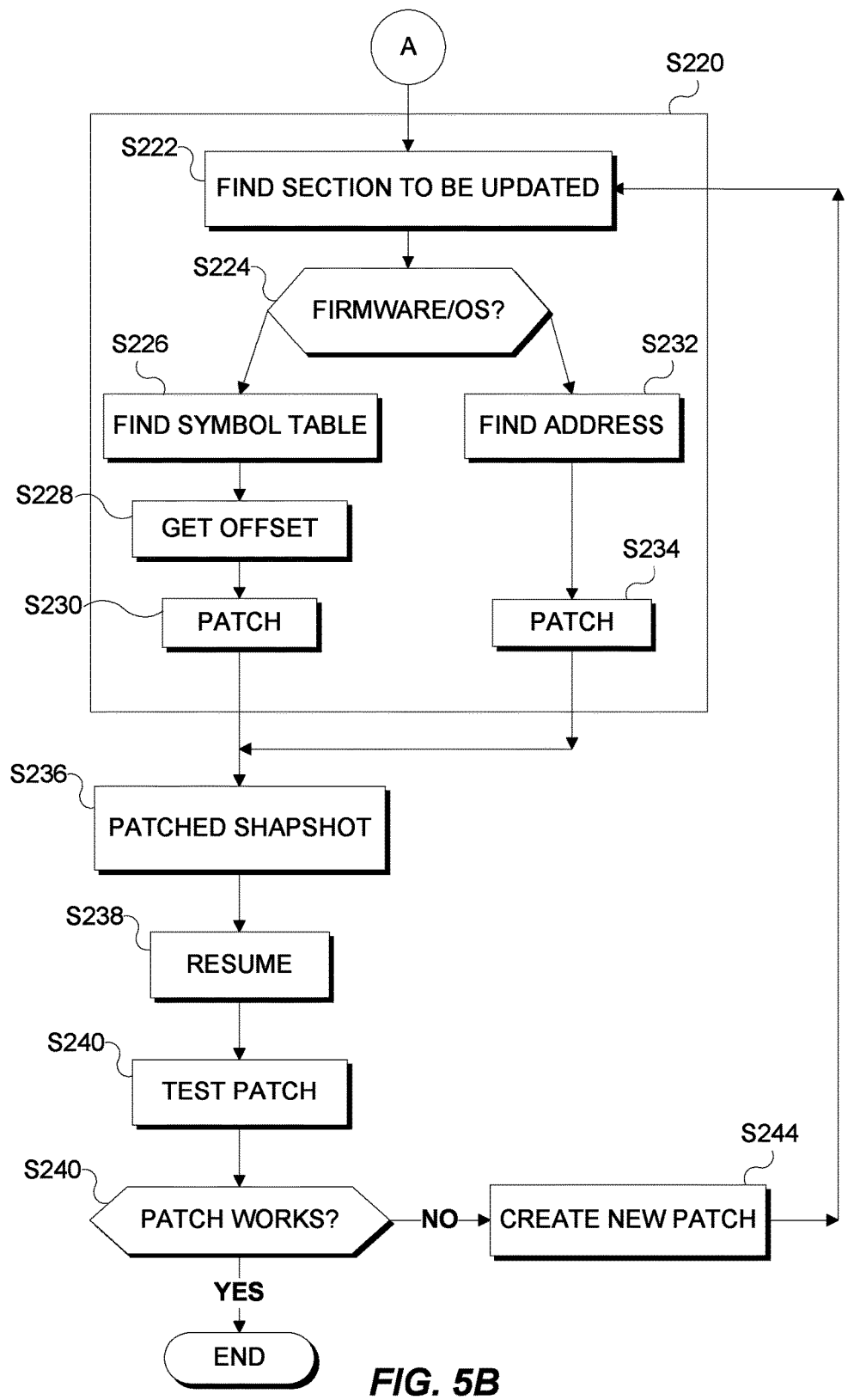

Referring to FIGS. 5A, and 5B, FIGS. 5A and 5B are flowcharts depicting operational steps of applying a patch in a test loop, in accordance with an embodiment of the present invention. In step S200, a trigger is set by the snapshot manager 24 which sets a breakpoint in the debugger server 70 of the virtual machines 10 and 12, in step S202. The program code is executed until the breakpoint is reached by the program code, in step S204. The snapshot manager 24 is informed about the breakpoint reached, in step S206 "YES" branch. The snapshot manager 24 sends a command to prepare for concurrent patch to the virtual machines 10 and 12, in step S208, which is received by the virtual machines 10 and 12 via external API, step S210, for preparing the concurrent patch in step S212 by synchronizing the processors 602. After a receipt of successfully preparing the snapshot manager 24 continues in step S214 with the initiation of creating the synchronized snapshots 34 and 36 of the virtual machines 10 and 12 in step S216. In step S218 the synchronized snapshots 34 and 36 are sent to the code patching machine S220 (FIG. 5B).

Referring to FIG. 5B, in various embodiments, the code patching machine 5220 is a further process for performing the code patches. The binary section to be patched is searched, in step S222. Depending on the code loads such as Operating Systems or Firmware, in step S224 two alternatives are shown. For Firmware the debugger server 70 is used to find the symbol data information 46, in step S226. An address offset is retrieved from an architecture table, in step S228, and the patch is executed, in step S230. For an Operating System, the debugger server 70 is used for finding the address in step S232. Thus the binary code sections 42 and 44 to be patched are determined by the process address stored in the respective synchronized snapshots 34 and 36, followed by performing the patch in step S234. The patching is performed by replacing program code segments as well as adapting references and/or applying relocations to the patched snapshots 35 and 37. The patched snapshots 35 and 37 are loaded to the virtual machines 10 and 12, in step S236 in order to resume the execution of the virtual machines 10 and 12 in step S238. A test scenario is performed on the patched virtual machines 10 and 12 in step S240. The test condition is fulfilled and the program flow stops, in decision step S242 "YES" branch. In various embodiments, the patch fails, in decision step S2240 "NO" branch and a new patch is created in step S244, returning to step S222 in the code patching machine S220 to find a binary code sections 42 and 44 to be patched.

Referring to FIG. 6, components of a generic computing system 600 are depicted, in accordance with an embodiment of the present invention. It should be appreciated that FIG. 6 provides an illustration of one implementation, for example, system 212 (shown in FIG. 1) and does not imply any limitations with regard to the environments in which different embodiments may be implemented. Many modifications to the depicted environment may be made.

Computing system 600 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, virtual machines 10 and 12, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing system 600 may also include a R/W drive or interface 614 to read from and write to one or more portable computer readable storage media 626. Application programs 611 on computing system 600 may be stored on one or more of the portable computer readable storage media 626, read via the respective R/W drive or interface 614 and loaded into the respective computer readable storage media 608.

Computing system 600 may also include a network adapter or interface 616, such as a TCP/IP adapter card or wireless communication adapter (such as a 4G wireless communication adapter using OFDMA technology) for connection to a network 617. Application programs 611 on computing system 600 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing system 600 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for applying a plurality of program patch sets on a plurality of computer programs, the method comprising:

preparing at least two virtual machines to be concurrently patchable, in response to suspending execution of a computer program on each of the virtual machines;

creating a synchronized snapshot of each of the at least two virtual machines;

determining a plurality of binary code sections of each of the synchronized snapshots;

analyzing symbol data information of each of the synchronized snapshot, based on the plurality of program patch sets;

replacing the determined plurality of binary code sections with a set of patch data, based on the plurality of program patch sets, resulting in a plurality of patched snapshots for each of the synchronized snapshots;

adjusting dependencies of the patch data, based on the replaced plurality of binary code sections; and resuming the execution of the computer program on each of the virtual machines using the plurality of patched snapshots.

2. The method of claim 1, wherein applying the plurality of program patch sets occurs simultaneously in at least two virtual machines running on at least one computer system.

3. The method of claim 1, wherein the method for applying the plurality of program patch sets is running in at least two physical machines.

4. The method of claim 1, wherein preparing at least two virtual machines to be concurrently patchable further comprises synchronizing one or more processing units.

5. The method of claim 1, wherein the analyzed symbol data information of each of the synchronized snapshot is based on a single program patch set within the plurality of program patch sets.

6. The method of claim 1, further comprising:
executing a plurality of test cases in the at least two virtual machines or at least two physical machines;
determining a test pass condition;
executing a subsequent patch set from a sequence of patch sets, in response to determining the test pass condition failed; and
executing one or more computer programs in one or more processing units, in response to determining the test pass condition successful.

7. The method of claim 1, further comprising:
generating the synchronized snapshot for each of the at least two virtual machines or the at least two physical machines, in response to detecting a break point by a debugger executing in at least two virtual machines or the at least two physical machines.

8. The method of claim 1, further comprising:
generating the synchronized snapshot for each the at least two virtual machines or the at least two physical machines at a pre-determined instant of time.

9. The method of claim 1, further comprising:
generating the synchronized snapshot for each of the at least two virtual machines or the at least two physical machines, in response to a pre-determined data being generated by the one or more computer programs.

10. The method of claim 1, further comprising:
replacing one or more computer programs in the at least two virtual machines or at least two physical machines, with the plurality of patched snapshots; and
resuming the execution of the at least two virtual machines or the at least two physical machines.

11. The method of claim 1, further comprising:
preparing one or more processing units;
executing one or more of the at least two virtual machines and the at least two physical machines; and
generating the synchronized snapshot of each of the at least two virtual machines or the at least two physical machines, wherein generating is performed by bringing the one or more processing units to a concurrent patchable state.

12. The method of claim 1, further comprising:
generating the synchronized snapshots by a snapshot manager;
triggering a hypervisor; and
running the hypervisor on a computer system.

13. The method of claim 12, further comprising:
controlling the testing of the plurality of patch sets by the snapshot manager; and
executing a debugger client.

14. The method of claim 13, further comprising:
determining the plurality of binary code sections to be patched using one or more of the debugger client and a combination of debugger clients.

15. The method of claim 14, further comprising:
determining the plurality of binary code sections to be patched, in response to analyzing symbol data information stored in synchronized snapshots associated with each binary code section of the plurality of binary code sections.

16. The method of claim 15, further comprising:
obtaining an address offset from an architecture table.

17. The method of claim 15, further comprising:
determining the plurality of binary code sections to be patched, in response to determining a process address stored in the synchronized snapshots associated with each binary code section of the plurality of binary code sections.

18. The method of claim 1, wherein applying the plurality of program patch sets on a plurality of computer programs further comprises:
replacing a program code segment;
identifying a plurality of references within the plurality of binary code sections;
adapting the plurality of references;
applying relocations to the plurality of binary code sections in the plurality of patched snapshots.

* * * * *